2,979,498
NEW MONOAZO DYESTUFFS

Herbert Francis Andrew, William Elliot Stephen, and Frederick Andrew Waite, Manchester, England, assignors to Imperial Chemical Industries Limited, London, England, a corporation of Great Britain
No Drawing. Filed Apr. 18, 1958, Ser. No. 729,239
Claims priority, application Great Britain Apr. 23, 1957
2 Claims. (Cl. 260—153)

This invention relates to new monoazo dyestuffs and more particularly it relates to new red monoazo dyestuffs obtained from cyanuric halides valuable for the production of colourations on cellulosic textile materials fast to wet treatments.

According to the invention there are provided the new monoazo dyestuffs, which, in their free acid form, are represented by the formula:

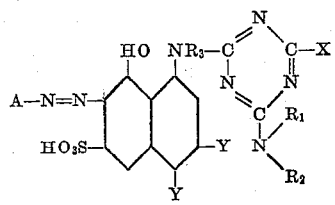

Formula I wherein A stands for a radical of the benzene series free from hydroxyl, amino or monoalkylamino groups, X stands for a halogen atom, $R_1$ stands for a hydrogen atom, or an alkyl or aryl radical free from metallisable systems, $R_2$ and $R_3$ may be the same or different and each stands for a hydrogen atom or an alkyl radical, A and $R_1$ are different being so chosen that one or both contains at least one sulphonic acid group, and one Y stands for a sulphonic acid group and the other Y stands for a hydrogen atom.

A may represent, for example an unsubstituted phenyl radical, or a phenyl radical substituted, for example, by alkyl such as methyl, by halogen such as chlorine or bromine, by alkoxy such as methoxy or ethoxy by carboxy or preferably by sulphonic acid, especially in the ortho position.

$R_1$, $R_2$ and $R_3$ may represent such alkyl radicals as, for example, methyl, ethyl, butyl, or hydroxyethyl radicals, and $R_1$ may alternatively represent an unsubstituted phenyl or naphthyl radical or a phenyl or naphthyl radical substituted by alkyl such as methyl, by halogen such as chlorine or bromine, by alkoxy such as methoxy or ethoxy or by carboxylic acid or sulphonic acid groups.

The new monoazo dyestuffs may be obtained by general methods known from the literature or used in practice by replacing one of the halogen atoms of a cyanuric halide by a radical of the formula:

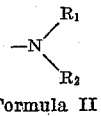

Formula II wherein $R_1$ and $R_2$ have the meanings given above, and a second halogen atom by a radical of the formula:

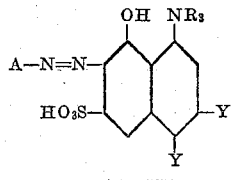

Formula III wherein and $R_3$ and Y have the meanings given above, under conditions such that the third halogen atom is substantially unreacted.

Thus, the starting materials used to manufacture the new dyestuffs comprise about equimolecular proportions of a cyanuric halide such as cyanuric chloride or cyanuric bromide, an amine of the formula:

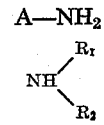

Formula IV wherein $R_1$ and $R_2$ have the meanings given above, an aromatic amine of the benzene series of the formula:

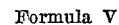

Formula V wherein A has the meaning given above, and a naphthol of the formula:

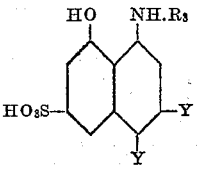

Formula VI wherein $R_3$ and Y have the meanings given above.

Suitable amines of the Formula IV include, for example, ammonia, methylamine, ethylamine, n-propylamine, n-butylamine, iso-propylamine, iso-butylamine, beta-hydroxyethylamine, di(beta-hydroxyethyl) amine, aniline, aniline o-, p- and m-sulphonic acid, o-, m- and p-anisidines, o-, m- and p-toluidines, 2:4-dimethylaniline, aniline o-, m- and p-carboxylic acids, anilines bearing other nuclear substituents such as chloro, alkoxy, or aryloxy, N-methylaniline and N-ethylaniline.

Suitable naphthols of Formula VI include for example, 1-amino-8-naphthol-3:6-disulphonic acid, 1-methylamino-8-naphthol-3,6-disulphonic acid, 1-ethylamino-8-naphthol-3:6-disulphonic acid, 1-butylamino-8-naphthol-3:6-disulphonic acid, 1-amino-8-naphthol-4:6-disulphonic acid, and 1-butylamino-8-naphthol-4:6-disulphonic acid.

Suitable aromatic amines of the Formula V include, for example, aniline, o-toluidine, p-toluidine, n-toluidine, o-, m- and p-anisidines, o-, m- and p-chloroanilines, aniline-2-sulphonic acid, aniline-2:5-disulphonic acid, 3-aminobenzotrifluoride-4-sulphonic acid, 2:4-dimethylaniline-6-sulphonic acid, 4-chloro-5-methylaniline-2-sulphonic acid, 5-chloro-4-methylaniline-2-sulphonic acid, 4-chloroaniline-2-sulphonic acid, 3:4-dichloroaniline-6-sulphonic acid, 2:4-dimethoxyaniline, 2:5-dimethoxyaniline, 2:4-dimethylaniline, 4-methoxyaniline-2-sulphonic acid and 5-methoxyaniline-2-sulphonic acid.

These starting materials may be reacted together in a number of ways in order to obtain the new dyestuff. Thus a diazonium compound obtained from the aromatic amine of Formula V may be coupled with the naphthol of Formula VI and the cyanuric halide reacted in either order with about one molecular proportion of each of the amino-azo compound so obtained and of the amine of Formula IV. Alternatively the cyanuric halide may be reacted in either order with the naphthol of Formula VI and the amine of Formula IV and the product so obtained coupled with a diazonium compound obtained from the aromatic amine of Formula V. In yet a different sequence of steps, the cyanuric halide is first reacted with the naphthol, the product so obtained is coupled with the diazonium compound and then the dihalogenotriazinylaminoazo compound so obtained is reacted with the amine of Formula IV.

In the above process the various steps may be carried out, if desired, in a single vessel without isolation of intermediate products. An aqueous medium is preferably used, but some care is necessary to avoid hydrolysis of the halogen atoms attached to the triazine nucleus in the cyanuric halide, various intermediate products and final dyestuff. The reaction step in which the first halogen atom of the cyanuric halide is replaced is preferably carried out below 5° C. but a higher temperature may be necessary. In general, a higher temperature is used for the step in which the second halogen atom of the cyanuric halide is replaced, than for the first. Where the coupling component used in a coupling step contains a triazine nucleus, the coupling is preferably carried out at as low a pH as will give efficient coupling ortho to the hydroxyl group of the naphthalene nucleus.

The dyestuff obtained may be isolated by customary techniques for the isolation of water-soluble dyestuffs, usually by precipitating the dyestuff in the form of its sodium salt by adding sodium chloride to the reaction medium and filtering off and drying the resulting precipitate.

In Belgian specification No. 543,218 there is disclosed a process for the colouring of cellulosic textile materials which comprises impregnating the said textile materials in aqueous medium with a monoazo or polyazo dyestuff which is characterised in that it contains at least one ionogenic solubilising group and also in that it contains at least once a primary or secondary amino group carrying as N-substituent a 1:3:5-triazine radical containing at least one halogen atom attached to a carbon atom of the triazine ring, and thereafter subjecting the said textile materials to the action of an acid-binding agent in aqueous medium. The new dyestuffs are valuable for use in this process. Also in the said specification there is described a process for printing cellulosic textile materials which comprises applying thereto a printing paste which contains a mono- or poly-azo dyestuff as hereinbefore defined and which also contains an acid-binding agent or a substance which on heating or steaming liberates an acid-binding agent, drying the said textile materials and thereafter subjecting the so-treated textile materials to the action of heat or steam. The new azo dyestuffs are particularly valuable for use in this printing process. They have an advantage over the dyestuffs specifically described in the said specification inasmuch as they are more stable in the printing pastes used, in the printing process, especially those containing acid-binding agents more strongly alkaline than sodium bicarbonate. Moreover the shades obtained from the red dyestuffs described in the said specification have the undesirable property of slowly becoming less fast to washing. This decrease in wash fastness is very slow under ordinary circumstances but is accelerated by storage in humid, acid atmospheres. The new azo dyestuffs are distinctly advantageous over those described in the said specification in that the shades obtained from the new dyestuffs retain their fastness to washing to a much higher degree.

The invention is illustrated but not limited by the following examples in which parts and percentages are by weight:

*Example 1*

A solution of 18.5 parts of cyanuric chloride in 100 parts of acetone is poured into a stirred mixture of 300 parts of water and 300 parts of crushed ice. An external freezing mixture is applied to reduce the temperature of the cyanuric chloride suspension, thus obtained, to below 0°. 6.7 parts of ammonia solution (S.G. .890) are added to the suspension and the mixture is stirred at 0° C. until the ammonia disappears, as indicated by the removal of alkalinity to brilliant yellow. Another 6.7 parts of ammonia solution (S.G. .890) are added and the mixture is stirred for one hour. Sufficient N hydrochloric acid is added to neutralise the mixture to brilliant yellow.

To the suspension of 2-amino-4:6-dichloro-1:3:5-triazine so formed, there is added a solution of 36.3 parts of the disodium salts of 1-amino-8-naphthol-3:6-disulphonic acid in 200 parts of water. The mixture is heated to 55° C. during 45 minutes and stirred at this temperature until the 1-amino-8-naphthol-3:6-disulphonic acid disappears. Sufficient 2 N sodium carbonate solution is added to neutralise the mixture to litmus and the solution of the secondary condensate, so obtained, is cooled to a temperature between 5° and 10° C.

40 parts of sodium acetate crystals are added to the solution and then there is added, during 5 minutes, a suspension of the diazo compound from 16.7 parts of aniline-2-sulphonic acid. The mixture is stirred for 20 hours at a temperature between 5° and 10° C. Sufficient anhydrous sodium carbonate is added to neutralise the mixture to litmus. The suspension is stirred for 2 hours further and sodium chloride is then added to give a concentration of 150 grams per litre. The precipitated dyestuff is filtered off and dried at 60° C.

When applied to cotton, by impregnation and subsequent treatment with an acid binding agent, or by printing from a print paste containing sodium carbonate or sodium bicarbonate the dyestuff so obtained yields red colourations which possess very good fastness to repeated severe washing and good fastness to light.

When cotton thus coloured is stored or exposed in a humid acidic atmosphere and afterwards washed, the proportion of the originally fixed dyestuff which is thereby removed, is considerably less than when a similar treatment is applied to cotton coloured by the above mentioned process using the dyestuff described in Example 5 of Belgian specification No. 543,218.

If in the above example ammonia is replaced by an equimolecular proportion of methylamine, dimethylamine or the sodium salt of aniline-3-sulphonic acid other valuable dyestuffs are produced which have similar properties to the dyestuff described above.

*Example 2*

To a cyanuric chloride suspension, formed as described in Example 1, there is added during twenty minutes, a solution of 36.3 parts of the disodium salt of 1-amino-8-naphthol-3:6-disulphonic acid in 200 parts of water, the temperature of the mixture during and subsequent to the addition being kept below 3° C. The reaction mixture is stirred until no unchanged 1-amino-8-naphthol-3:6-disulphonic acid remains in the resulting solution. 40 parts of sodium acetate crystals are added to the solution and its temperature is allowed to rise to between 5° and 10° C.

To the solution of the mono condensate, there is now added during 15 minutes, a solution of 12.95 parts of aniline hydrochloride in 150 parts of water. The mixture is stirred for 20 hours the temperature rising from 5° to 20° C. Sufficient 2 N sodium carbonate solution is added to neutralise the mixture to litmus: 40 parts of sodium acetate crystals are added and the solution is cooled to a temperature between 5° and 10° C.

To the suspension of the secondary condensation product so obtained there is added, during 15 minutes, a suspension of the diazo compound from 15.7 parts of aniline-2-sulphonic acid, and the mixture is stirred for 20 hours at a low temperature. Sufficient anhydrous sodium carbonate, to neutralise the mixture to litmus is then added. Stirring is continued for 2 hours longer and the dyestuff, which is sufficiently precipitated is filtered off and dried at 60° C.

This dyestuff has similar properties to the dyestuffs described in Example 1 and yields dyeings and prints on cotton which have similar fastness properties.

*Example 3*

Diazotised aniline-2-sulphonic acid is coupled with 1 - (2':4' - dichloro - 1':3':5' - triazin - 6' - ylamino) - 8-naphthol-3:6-disulphonic acid as described in Example 1 of Belgian specification No. 543,213 and 71.7 parts of the trisodium salt of the product obtained are dissolved in 2500 parts of water. A solution of 12.95 parts of aniline hydrochloride in 150 parts of water is added and the mixture is heated to a temperature between 30 and 35° C. Hydrochloric acid is evolved as reaction takes place and 2 N sodium carbonate solution is added to keep the solution neutral to Congo red paper. The temperature is maintained until no further hydrochloric acid is produced when the reaction mixture is neutralised to litmus with 2 N sodium carbonate solution and then allowed to cool to 20° C. Sufficient sodium chloride is added to give a concentration of 100 grams per litre and the precipitated dyestuff is filtered off and dried at 60° C.

The dyestuff produced by this method is the same as that obtained in Example 2 and it has the same fastness and aging properties when dyed on cotton.

The following table describes the shades obtained from further examples of dyestuffs of the invention obtained by the general method described in the above example, i.e. by coupling a diazo salt of the amine named in the first column with the N-dichloro-s-triazinyl derivative of the aminonaphthol named in the second column and condensing the resultant product with 1 molecular proportion of the amine named in the third column:

| Diazo component | Aminonaphthol | Amine | Shade |
| --- | --- | --- | --- |
| Aniline | 1-Amino-8-naphthol-3:6-disulphonic acid. | Aniline-3-sulphonic acid. | Bluish red. |
| Do | do | Aniline-4-sulphonic acid. | Do. |
| Aniline-2-sulphonic acid. | do | 2-Hydroxyethylamine. | Red. |
| Do | do | Ethylamine | Do. |
| Do | do | 2:2'-Dihydroxydiethylamine. | Do. |
| Do | do | Morpholine | Do. |
| Do | do | cyclo-Hexylamine | Do. |
| Do | do | Piperidine | Do. |
| Do | do | Benzylamine | Do. |
| Do | do | 3-Aminobenzoic acid. | Do. |
| Do | do | Aminoacetic acid | Do. |
| Do | do | N-Methylaniline | Do. |
| Do | do | 3-Methylaniline | Do. |
| Do | do | 4-Methylaniline | Do. |
| Do | do | 2-Chloroaniline | Do. |
| Do | do | 4-Chloroaniline | Do. |
| Do | do | 3-Aminoacetanilide | Do. |
| Do | do | 4-Aminodiphenylether. | Do. |
| Do | do | 4-Nitroaniline | Do. |
| Do | do | 1-Naphthylamine | Do. |
| Do | do | 1-Naphthylamine-6-sulphonic acid. | Do. |
| Do | 1-n-butylamino-8-naphthol-3:6-disulphonic acid. | Aniline | Reddish orange. |

*Example 4*

To a cyanuric chloride suspension, formed as described in Example 1 and maintained at a temperature between 0 and 5° C., there is added during 20 minutes a solution of 20 parts of aniline-2-sulphonic acid. The mixture is stirred for 20 minutes, aqueous sodium carbonate being added to maintain the mixture just neutral to delta paper.

The product so obtained is then condensed in situ with 1-amino-8-naphthol-3:6-disulphonic acid and the resulting product then coupled with diazotised aniline using the reaction conditions described in the second and third paragraphs of Example 1.

The product obtained in a bluish red dyestuff, similar in its properties to that obtained in Example 1.

The following table describes the shades obtained from further examples of dyestuffs of the invention, obtained by the general method described in Example 2 i.e. by condensing cyanuric chloride with one molecular proportion of the amino naphthol named in the second column, condensing the product so obtained with one molecular proportion of the amine named in the third column, and then coupling the product with a diazo salt of the amine named in the first column.

| Diazo component | Aminonaphthol | Amine | Shade |
| --- | --- | --- | --- |
| Aniline-3-sulphonic acid | 1-Amino-8-naphthol-3:6-disulphonic acid. | Aniline | Bluish red. |
| Aniline-4-sulphonic acid | do | do | Do. |
| Aniline-2:5-disulphonic acid. | do | do | Red. |
| 4-Nitroaniline-2-sulphonic acid. | do | do | Bluish red. |
| 4-Aminoanisole-3-sulphonic acid. | do | do | Reddish violet. |
| 4-Methylaniline-2-sulphonic acid. | do | do | Bluish red. |
| 2-Amino-5-sulpho-benzoic acid. | do | do | Do. |
| 4-Chloro-5-methyl-aniline-2-sulphonic acid. | do | do | Do. |
| Aniline-2-carboxylic acid | do | Aniline-3-sulphonic acid. | Do. |
| m-Toluidine | do | do | Do. |
| o-Anisidine | do | do | Reddish violet. |
| o-Chloraniline | do | do | Bluish red. |
| 2-Nitroaniline | do | do | Do. |
| 3-Aminobenzotrifluoride-4-sulphonic acid. | do | Aniline | Red. |
| 4-Aminodiphenyl-3-sulphonic acid. | do | do | Violet. |
| Aniline-2-sulphonic acid | 1-Amino-8-naphthol-4:6-disulphonic acid. | do | Red. |
| Aniline | do | Aniline-3-sulphonic acid. | Do. |

What we claim is:
1. The dyestuff of the formula:

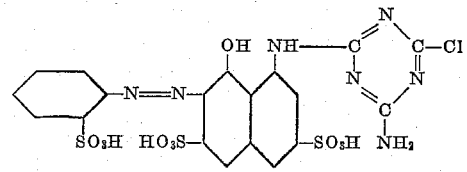

2. The dyestuff of the formula:

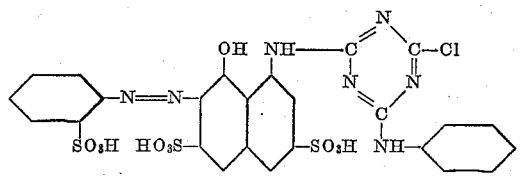

References Cited in the file of this patent
UNITED STATES PATENTS 1,667,312 Fritzsche et al. _____ Apr. 24, 1928
1,867,451 Gyr et al. _____ July 12, 1932

FOREIGN PATENTS 1,139,796 France _____ Feb. 18, 1957

OTHER REFERENCES

Sommer: "American Dyestuff Reporter," volume 47, No. 25, pages p895–p899 (December 15, 1958).